US010501652B2

(12) United States Patent
Ishimi et al.

(10) Patent No.: US 10,501,652 B2
(45) Date of Patent: Dec. 10, 2019

(54) INK SET AND PRINTING APPARATUS (71) Applicant: CANON KABUSHIKI KAISHA, Tokyo (JP)

(72) Inventors: Keita Ishimi, Yokohama (JP); Rie Takekoshi, Kawasaki (JP); Tatsuo Shimmoto, Tokyo (JP); Takayuki Ushiyama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/902,890

(22) Filed: Feb. 22, 2018

(65) Prior Publication Data
US 2018/0244945 A1 Aug. 30, 2018

(30) Foreign Application Priority Data
Feb. 27, 2017 (JP) ................. 2017-035389

(51) Int. Cl.
| *C09D 11/54* | (2014.01) |
| *B41J 2/11* | (2006.01) |
| *C09D 11/322* | (2014.01) |
| *C09D 11/38* | (2014.01) |
| *C09D 11/106* | (2014.01) |
| *C09D 11/40* | (2014.01) |

(52) U.S. Cl.
CPC ................ *C09D 11/54* (2013.01); *B41J 2/11* (2013.01); *C09D 11/106* (2013.01); *C09D 11/322* (2013.01); *C09D 11/38* (2013.01); *C09D 11/40* (2013.01)

(58) Field of Classification Search
CPC ....... C09D 11/54; C09D 11/106; C09D 11/40; C09D 11/38; C09D 11/322; B41J 2/11
See application file for complete search history.

(56) References Cited

U.S. PATENT DOCUMENTS

| 2005/0012796 A1* | 1/2005 | Doi ........................ C09D 11/30 347/100 |
| 2010/0201736 A1* | 8/2010 | Ooishi ................... B41J 2/2114 347/21 |
| 2012/0013666 A1* | 1/2012 | Takekoshi .............. B41J 2/2114 347/15 |

FOREIGN PATENT DOCUMENTS

| JP | 5-202328 A | 8/1993 |
| JP | 2005-220352 A | 8/2005 |

* cited by examiner

Primary Examiner — Yaovi M Ameh
(74) Attorney, Agent, or Firm — Canon U.S.A. Inc., IP Division (57) ABSTRACT

An ink set including a first ink containing a pigment and a water-soluble resin having an anionic group, a second ink containing substantially no pigment and a reactive component, and a third ink containing a polymer emulsion and a water-soluble resin having an anionic group. The pKa of the reactive component is lower than the pKa of the anionic group of the water-soluble resin in the first ink and higher than the pKa of the anionic group of the water-soluble resin in the third ink.

24 Claims, 8 Drawing Sheets

INK SET AND PRINTING APPARATUS

BACKGROUND OF THE INVENTION

Field of the Invention

The present disclosure relates to an ink set and a printing apparatus.

Description of the Related Art

There has been known a printing apparatus operable to print an image on a printing medium by a printing head ejecting an ink while traversing (scanning) the printing medium in a direction (scanning direction). This type of printing apparatus has been increasingly used to produce printed articles for various applications, and various types of ink are used accordingly.

Japanese Patent Laid Open No. 2005-220352 discloses a method for fixing an image on a printing medium by using an ink containing a pigment and a polymer emulsion. In this method, the ink dropped on the printing medium is heated so that the polymer emulsion forms a coating film on the surface of the printing medium, thereby fixing the image. According to this prior art document, the coating film formed by heating the polymer emulsion enhances the fastness of the printed image.

In the recording apparatus mentioned above, however, droplets of different inks on a printing medium are likely to be attracted to each other and cause bleeding among the droplets, degrading image quality. Japanese Patent Laid-Open No. 5-202328 discloses an idea that a solution containing a multivalent metal salt is applied onto the printing medium before an ink containing a compound having a carboxy group is applied. According to this prior art document, the multivalent metal salt and the carboxy group come into contact with each other on the printing medium to form an insoluble substance, thereby reducing the occurrence of bleeding.

The present inventors however found that if an ink as disclosed in Japanese Patent Laid-Open No. 2005-220352 containing a pigment and a polymer emulsion is used in combination with a solution (hereinafter referred to as reaction liquid) capable of reacting with the pigment from the viewpoint of reducing the occurrence of bleeding, it becomes difficult to produce satisfactorily high-quality images.

The reason is probably as below. First, the solids content in the ink increases. While normal ink contains only pigment, the ink disclosed in Japanese Patent Laid-Open No. 2005-220352 contains a polymer emulsion with a relatively large proportion. Accordingly, the content of solids (pigment and particles of the emulsion) in one droplet of the ink on the printing medium increases. This can cause clogging of ejection openings. Although clogging may be reduced by increasing the diameter of the ejection openings to increase the amount of ink to be ejected through each opening, this increases the diameter of each ink droplet and results in a reduced definition and a reduced glossiness.

In addition, unnecessary application of the polymer emulsion may interfere with the formation of high-quality images. For producing a printed article as an outdoor exhibit, an ink containing a pigment and a polymer emulsion may be used. In this instance, the ink is heated so that the polymer emulsion forms a coating film, thus producing a printed article resistant to water and rubbing. In such an industry, the polymer emulsion-containing ink is also used for producing printed articles intended as indoor exhibits as well as outdoor exhibits. However, application of the polymer emulsion often results in a reduced glossiness. The inventors worry that use of an ink containing a polymer emulsion contrarily reduce the glossiness of printed articles.

To suppress to some extent the degradation of image quality resulting from the phenomenon just described, the pigment and the polymer emulsion may be added in respective inks. In this instance, however, if the polymer emulsion is reactive to the reaction liquid, glossiness may be reduced. If the polymer emulsion reacts with the reaction liquid, the polymer emulsion flocculates and does not form a uniform coating over the surface of the image, increasing the surface roughness of the image.

SUMMARY OF THE INVENTION

The present disclosure achieves glossy printed articles with reduced bleeding by printing using a polymer emulsion-containing ink.

According to an aspect of the present disclosure, there is provided an ink set including different inks having different functions. The inks include a first ink containing a pigment as a coloring material and a water-soluble resin having an anionic group, a second ink containing substantially no coloring material and a reactive component reactive with the first ink, and a third ink containing substantially no coloring material, polymer emulsion, and a water-soluble resin having an anionic group. The pKa of the reactive component in the second ink is lower than the pKa of the anionic group of the water-soluble resin in the first ink and higher than the pKa of the anionic group of the water-soluble resin in the third ink.

Further features will become apparent from the following description of exemplary embodiments with reference to the attached drawings.

DESCRIPTION OF THE EMBODIMENTS

Exemplary embodiments of the present disclosure will now be described with reference to the drawings.

First Embodiment

Figure 1:
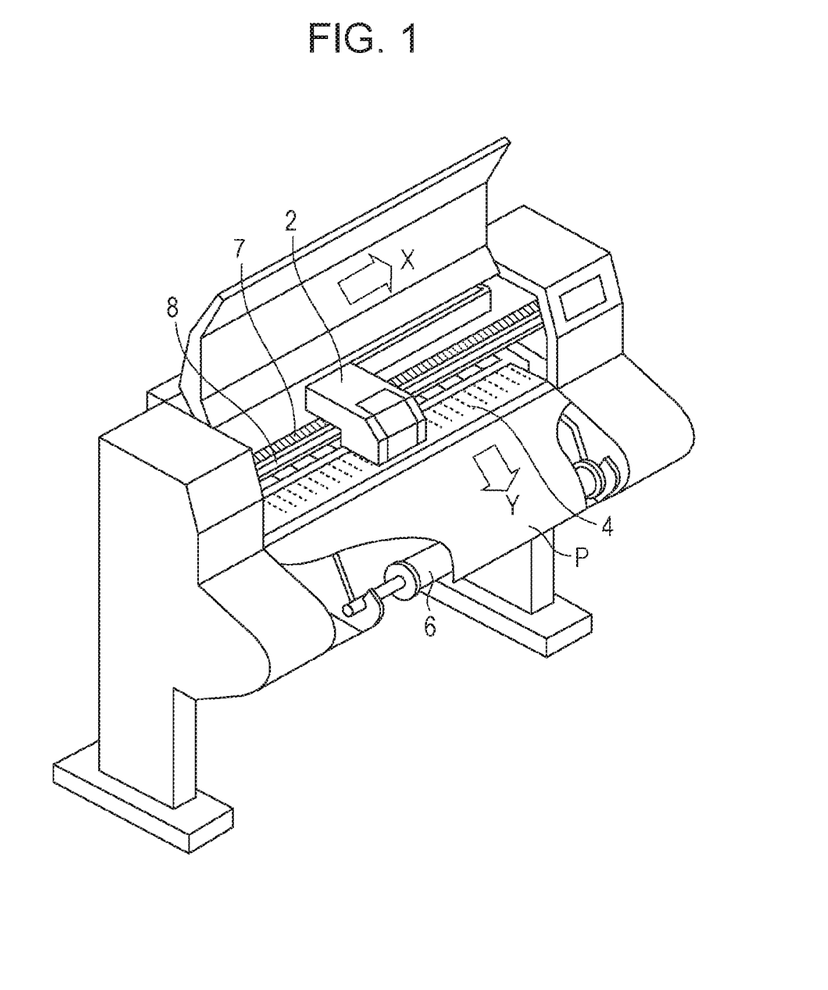
FIG. 1 is a perspective view of a printing apparatus according to an embodiment of the present disclosure.

FIG. 1 depicts the appearance of an ink jet printing apparatus (hereinafter also referred to as the printing apparatus or the printer) according to an embodiment of the present disclosure. This printing apparatus is what is called a serial scan printer, which prints an image on a printing medium P being conveyed in a direction Y (conveying direction) while the printing head traverses (scans) in a direction X (scanning direction) perpendicular to the direction Y.

The structure of this ink jet printer and the operation thereof during printing will now be roughly described with reference to FIG. 1. First, a printing medium P is conveyed in the Y direction from a spool 6 holding the printing medium P by a conveying roller driven with a gear by a conveying motor (not shown). A carriage unit 2 is reciprocally moved to travers (scan) the printing medium P along a guide shaft 8 extending in the X direction by a carriage motor (not shown). The printing apparatus causes a printing head (described herein later) mountable to the carriage unit 2 to eject an ink through ejection openings at a timing based on a positional signal converted by an encoder 7, thus printing a band having a predetermined width corresponding to the arrangement of the ejection openings. In the present embodiment, the carriage unit 2 traverses at a scanning speed of 40 inches per second, and the printing head ejects the ink at a resolution of 600 dpi (1/600 inches). Then, the printing medium P is conveyed and printed in the next band with the predetermined width. The carriage unit 2 may traverse at a scanning speed of more than 40 inches per second.

The driving force from the carriage motor to the carriage unit 2 may be transmitted by a carriage belt. As an alternative to the carriage belt, a mechanism may be used which includes, for example, a leadscrew extending in the X direction an d rotated by the carriage motor, and an engaging member provided for the carriage unit 2 and engaged with the groove of the leadscrew.

The printing medium P is conveyed, with being pinched between a feed roller and a pinch roller, to a printing position (region that the printing head scans) on a platen 4. Normally, in a quiescent state, the face of the printing head is provided with a cap. The cap is removed before starting printing so that the printing head or the carriage unit 2 can scan. Then, on storing data of one scanning operation in a buffer, the carriage motor drives the carriage unit 2 for scanning. Printing is thus performed.

The printing apparatus also includes a heating device (not shown) operable to heat a clear emulsion ink (described herein later) to form a coating film. The heating device may be disposed over the printing head so as to heat the underlying printing medium on which an image has been printed. Alternatively, the heating device may be disposed under the platen 4 so as to heat the overlying printing medium on which an image has been printed.

The printing apparatus of the present embodiment performs printing in such a manner that an image is printed in a unit area (1/n band) of the printing medium P by a plurality of times (n times) of scanning of the printing head. This is what is called multi-pass printing. The multi-pass printing technique will be described in detail herein later.

Figure 2:
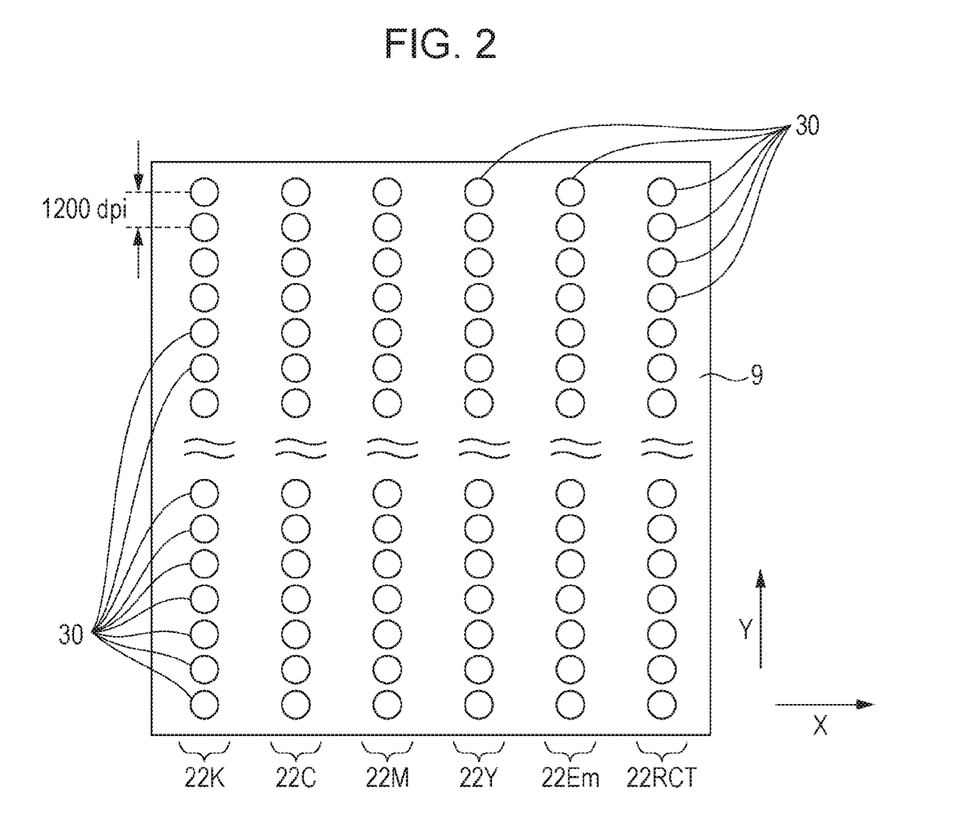
FIG. 2 is a schematic view of a printing head used in an embodiment of the present disclosure.

FIG. 2 depicts a printing head 9 of the printing apparatus according to the present embodiment. The printing head 9 has a line 22K of ejection openings 30 through which a black ink (K) is ejected, a line 22C of ejection openings 30 through which a cyan ink (C) is ejected, a line 22M of ejection openings 30 through which a magenta ink (M) is ejected, and a line 22Y of ejection openings 30 through which a yellow ink (Y) is ejected. The black ink (K), the cyan ink (C), the magenta ink (M), and the yellow ink (Y) each contain a pigment as a coloring material. Such an ink may be hereinafter referred to as a pigment ink.

Also, the printing head 9 has a line 22RCT of ejection openings 30 through which a reaction liquid (RCT) containing no coloring material is elected. The reaction liquid will come into contact with the ink containing a coloring material, thereby improving image quality in terms of at least one of bleeding, glossiness, and graininess.

The printing head 9 further has a line 22Em of ejection openings 30 through which a clear emulsion ink (Em) is ejected. The clear emulsion ink contains a polymer emulsion, but no coloring material. The clear emulsion ink, after being applied onto the printing medium, is heated to form a coating film acting to improve at least one of the rub fastness, water resistance, and light fastness of the printed image.

In the printing head 9, the ejection opening lines 22K, 22C, 22M, 22Y, 22Em, and 22RCT are arranged in this order in the X direction from left to right. Each of the ejection opening lines 22K, 22C, 22M, 22Y, 22Em, and 22RCT has 1280 ejection openings 30 aligned in the Y direction (aligning direction) with a density of 1200 dpi. In the present embodiment, the amount of ink elected at one time through one ejection opening 30 is about 4.5 pL.

Each of the ejection opening lines 22K, 22C, 22M, 22Y, 22Em, and 22RCT communicates with a corresponding ink tank (not shown) that stores the corresponding ink, and the ink fed from the ink tank. The printing head 9 and the ink tank may be integrated into one body or may be separable.

The compositions of the black ink (K), the cyan ink (C), the magenta ink (M), the yellow ink (Y), the clear emulsion ink (Em), and the reaction liquid (RCT) will be described herein later.

Figure 3:
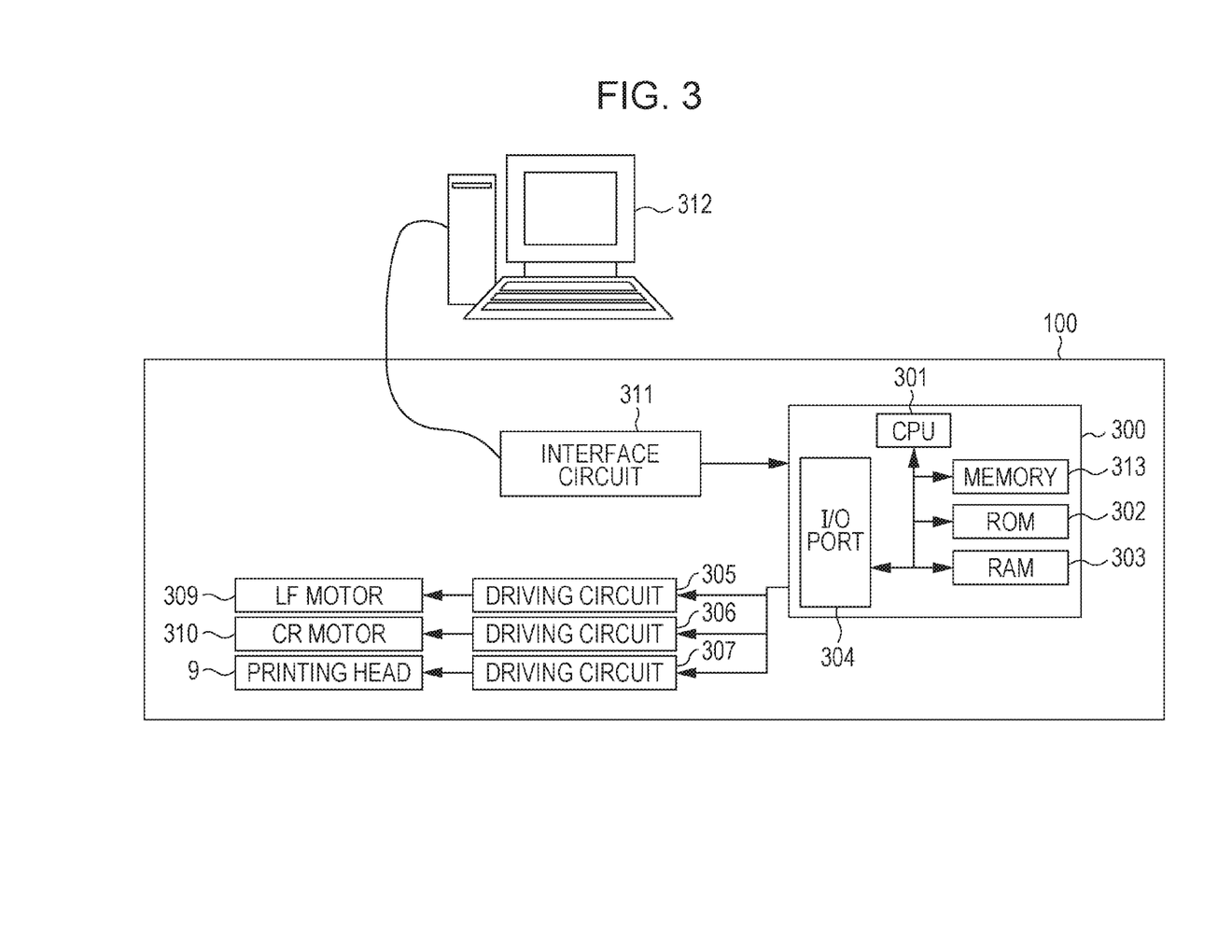
FIG. 3 is a block diagram of the structure of a print control system according to an embodiment of the present disclosure.

FIG. 3 is a block diagram schematically illustrating the structure of a print control system in a printing apparatus 100 according to the present embodiment. A main control section 300 includes a CPU 301 operable to execute processing operation, such as arithmetic calculation, selection, discrimination, and control, and printing operation; a ROM 302 storing a control program and the like to be executed by the CPU 301; a RAM 303 used as a buffer or the like of printing data, and an input/output port 304. A memory device 313 stores mask patterns or the like that will be described herein later. The input/output port 304 is connected to a conveying motor (LF motor) 309, a carriage motor (CR motor) 310, a printing head 9, and driving circuits 305, 306, and 307 including an actuator of a disconnection unit. The main control section 300 is connected to a PC 312 acting as a host computer via an interface circuit 311.

Data Processing

Figure 4:
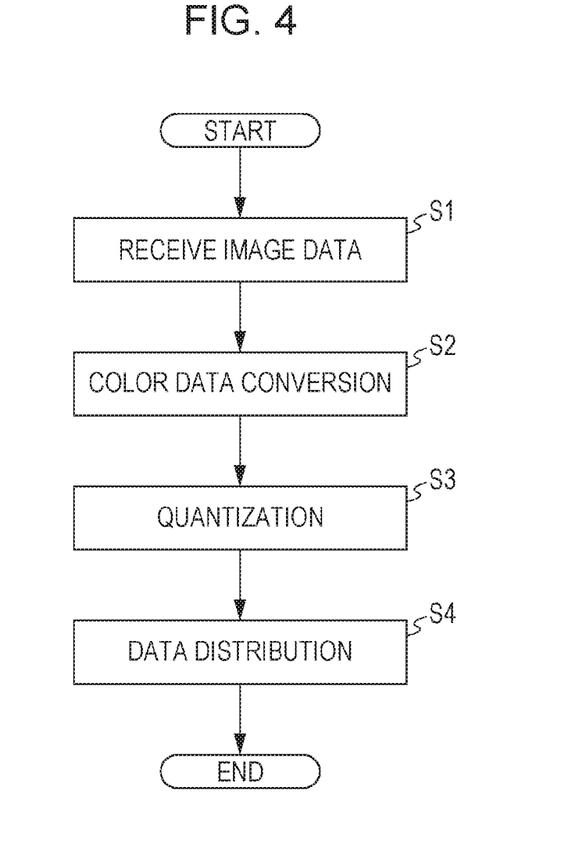
FIG. 4 is a flow chart of a data processing process used in an embodiment of the present disclosure.

Turning now to FIG. 4, this is a flow chart of printing data generation executed by the CPU 301 according to the control program used in the present embodiment.

First, in step S1, the CPU 301 receives image data (luminance data) of each color of red (R), green (G), and blue (B) represented by 8 bits (256 values of 0 to 255) inputted to the printing apparatus 100 from the host computer, or PC 312.

Subsequently, in step S2, the R, C, and B image data are converted to multivalued data of a plurality of inks (K, C, B, Y, Em, and RCT). This color conversion processing generates multivalued data represented by 8 bits, 256 values (0 to 255) defining the tone of each of the inks K, C, B, Y, Em, and RCT.

Subsequently, in step S3, the multivalued data of K, C, B, Y, Em, and RCT are quantized to generate quantized data (binary data) represented by 1 bit (2 values of 0 and 1)

determining whether or not the inks K, C, B, Y, Em, and RCT are each ejected. This quantization is executed in accordance with a variety of method, such as error diffusion, dithering, or an index method.

Then, in step S4, the quantized data are distributed to a plurality of times of scanning operation performed on the unit area by the printing head. Through this data distribution, printing data are generated which are represented by 1 bit (2 values of 0 and 1) and determine whether or not each of the inks K, C, M, Y, Em, and RCT is ejected to the corresponding pixel by each scanning operation for the unit area of the printing medium. The data distribution is executed by using mask patterns corresponding to the plurality of times of scanning and determining whether or not each pixel accepts the corresponding ink ejection.

In the present embodiment, the inks are ejected according to the printing data thus generated.

Although in the present embodiment, the CPU 301 in the printing apparatus 100 executes all the steps S1 to S4, other embodiments may be implemented. For example, in an embodiment, all the steps S1 to S4 may be executed in the PC 312. In another embodiment, some of the steps may be executed in the PC 312, and the rest of the steps may be executed in the printing apparatus 100.

Multi-Pass Printing

In the present embodiment, an image is printed by a multi-pass printing technique that is performed by applying the inks K, C, M, Y, Em, and RCT to a unit area of the printing medium by a plurality of times of scanning operation. In the present embodiment, the same mask patterns are used for the inks K, C, M, Y, Em, and RCT in step S4. The order of applying inks K, C, M, Y, Em, and RCT in a plurality of times of scanning is not particularly limited. In the present embodiment, each unit area is printed by 6 times of scanning.

Figure 5:
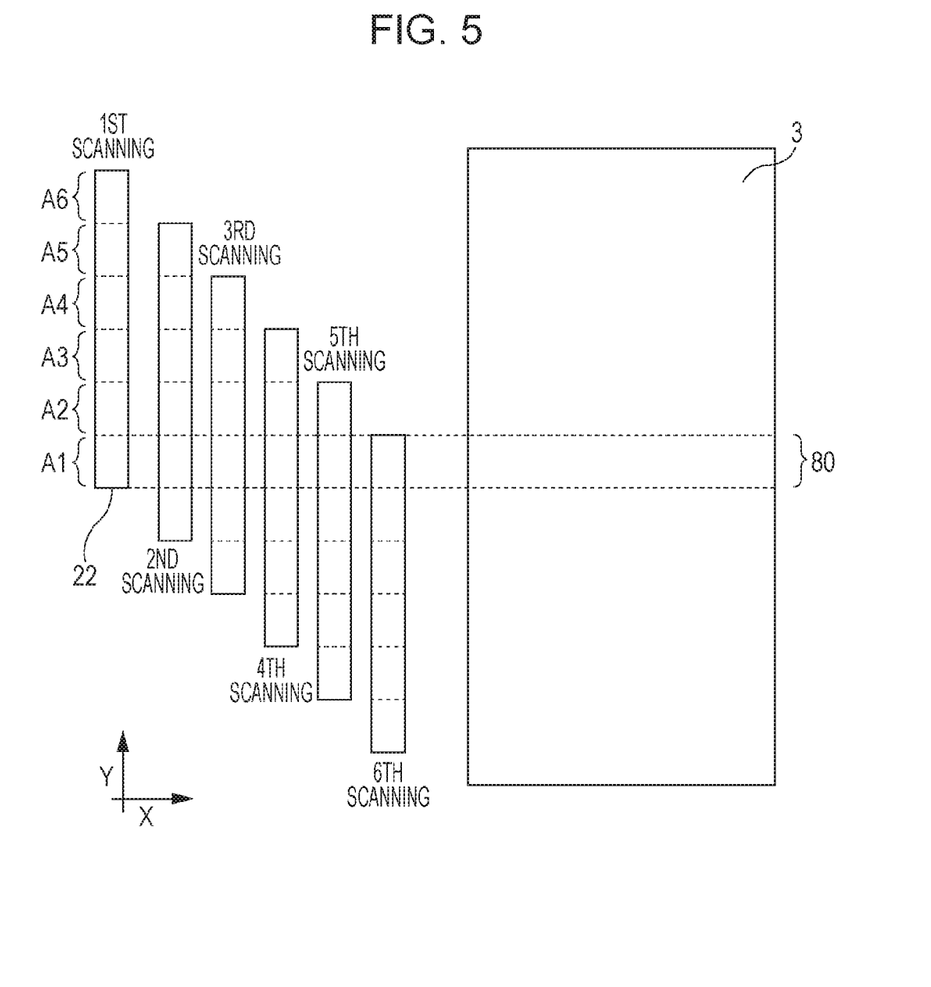
FIG. 5 is an illustrative representation of multi-pass printing applied to an embodiment of the present disclosure.

FIG. 5 is a representation of the multi-pass printing used in the present embodiment. In the present embodiment, each line 22 of the ejection openings is divided in the Y direction into 6 groups A1 to A6 of ejection openings, and the inks are ejected through the ejection openings in the corresponding group in each of the 6 times of scanning for the unit area. Although in the actual printing, the printing medium 3 is conveyed in the Y direction every time of scanning of the printing head 9, FIG. 5 illustrates for simplification as if the printing head 9 moves in the direction opposite to the Y direction.

In the first scanning, the printing head 9 moves in a state where group A1 of the ejection opening lines 22 corresponds to a unit area 80 on the printing medium 3, and each ink is ejected onto the unit area 80 through the ejection openings in group A1 according to the printing data for the first scanning generated in step S4. After the first scanning is completed, the printing medium 3 is conveyed a distance corresponding to the one ejection opening group in the Y direction. Then, in the second scanning, each ink is ejected onto the unit area 80 through the ejection openings in group A2. Subsequently, the inks are ejected in the third to the sixth scanning through the ejection openings in the respective groups A3 to A6 onto the unit area 80 by alternations between the conveyance of the printing medium and the ink ejection from the printing head. Thus, multi-pass printing for the unit area 80 is completed.

Figure 6:
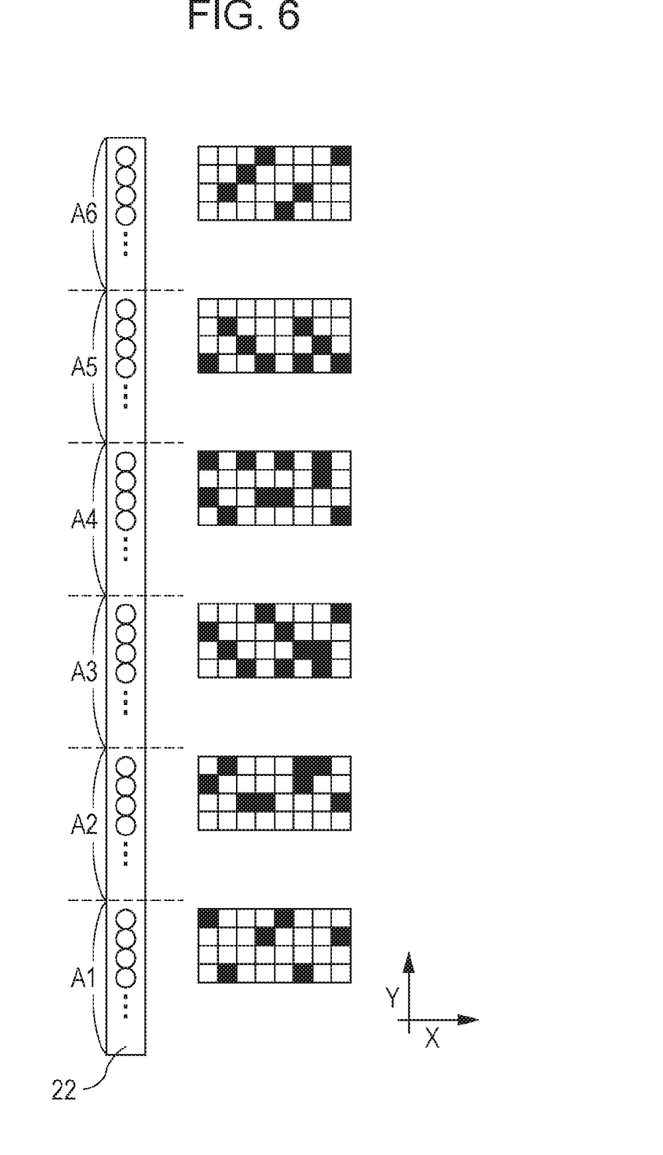
FIG. 6 is an illustrative representation of mask patterns used in an embodiment of the present disclosure.

FIG. 6 is an illustrative representation of mask patterns used in the present embodiment. In the patterns shown in FIG. 6, the black solid portions represent pixels that accept the ejection of ink determined by the quantized data (hereinafter referred to as printable pixels), and the white, blank portions represent pixels that do not accept ejection of ink even though the ejection is determined by the quantized data (hereinafter referred to as non-printable pixels). The mask patterns shown in FIG. 6 each have a size corresponding to 4 pixels×8 pixels. By repeatedly using these mask patterns in the X and the Y direction, all the quantized data for each unit area are distributed.

The 6 mask patterns shown in FIG. 6 each have 32 pixels (4 pixels×8 pixels), and the total number of the printable pixels in the 6 mask patterns is 48 pixels. The printable percentage, that is, the percentage of the total number of printable pixels in the patterns shown in FIG. 6 to the number of pixels of one mask pattern is 150% (=48/32×100).

For the mask pattern for each time of scanning, the mask pattern for the first scanning (using ejection opening group A1) and the mask pattern for the sixth scanning (using ejection opening group A6) each have 6 printable pixels. Hence, the printable percentages of the mask patterns for the first and the sixth scanning are each about 20% (=6/32×100).

The mask pattern for the second scanning (using ejection opening group A2) and the mask pattern for the fifth scanning (using ejection opening group A5) each have 8 printable pixels. Hence, the printable percentages of the mask patterns for the second and the fifth scanning are each about 25% (=8/32×100).

The mask pattern for the third scanning (using ejection opening group A3) and the mask pattern for the fourth scanning (using ejection opening group A4) each have 10 printable pixels. Hence, the printable percentages of the mask patterns for the third and the fourth scanning are each about 30% (10/32×100).

In the present embodiment, the same mask patterns as in FIG. 6 are applied to the quantized data for each ink. Accordingly, the order of applying the inks K, C, M, Y, Em, and RCT in a plurality of times of scanning is random without being controlled.

Compositions of Inks

The compositions of the inks according to the present embodiment will now be described. In the following description, "part(s)" and "%" are on a mass basis unless otherwise specified.

1. Compositional Requirements for Inks

The inks of the present embodiment are adjusted so that the acid dissociation constant pKa of the reactive component in the reaction liquid RCT is lower than the pKa of the water-soluble resin in each of the pigment inks C, M, Y, and K and higher than the pKa of the water-soluble resin in the polymer emulsion Em.

An acid dissociation constant pKa is a quantitative measure of the strength of an acid and is represented by using a negative common logarithm for the hydrogen-releasing dissociation reaction of the acid. In general, the lower the pKa, the stronger the acid.

In the present embodiment, it is beneficial that the reactive component in the reaction liquid has such an acid strength as to keep the fine particles of the polymer emulsion dispersed in the clear emulsion ink and destroy the dispersion of the pigment in the pigment inks.

In the present embodiment, the polymer emulsion and the pigments are each dispersed with a resin. More specifically, a water-soluble resin having an anionic group is attached to the surfaces of the particles of the pigments and polymer emulsion. In these states, the three pKa of the anionic group of the water-soluble resin attached to the pigment, the anionic group of the water-soluble resin attached to the polymer emulsion, and the reactive component are adjusted as described below. In the following description, the pKa of the anionic group of the water-soluble resin attached to the pigment is represented as PigpKa; the pKa of the anionic group of the water-soluble resin attached to the polymer emulsion is represented as EmpKa; and the pKa of the reactive component is represented as AcpKa.

In the present embodiment, the pigment in each ink is allowed to react with the reactive component in the reaction liquid, thereby reducing bleeding. Accordingly, a substance having a higher acid strength than the anionic group of the water-soluble resin attached to the pigment is used as the reactive component. Hence, PigpKa>AcpKa holds true.

Also, the reactive component has a lower acid strength than the anionic group of the water-soluble resin attached to the polymer emulsion so that the polymer emulsion does not react with the reactive component, from the viewpoint of preventing the polymer emulsion from interfering with the full reaction of the pigment with the reactive component. Hence, AcpKa>EmpKa holds true.

Thus, the inks used in the present embodiment satisfy the relationship: PigpKa>AcpKa>EmpKa. When these inks satisfying this relationship come into contact with each other, the pigment is likely to precipitate and the polymer emulsion is unlikely to precipitate.

Accordingly, in the present embodiment, an appropriate combination of the reactive component and each of the anionic groups of the water-soluble resins of the pigment and the polymer emulsion is selected.

Details will now be described. For example, glutaric acid is used as the reactive component. Glutaric acid has a pKa of about 4.3. If a dispersion contains a sulfonate ($-SO_3$), the sulfonate is less reactive with the reactive component or glutaric acid because sulfonic acid has a pKa of about 3.0. Thus, the polymer emulsion used in the present embodiment is in a state of dispersion containing a sulfonate so that the polymer emulsion is less reactive with the reaction liquid.

If a dispersion contains a carboxylate ($-COO$), the carboxylate is reactive with glutaric acid because acetic acid has a pKa of about 4.8. Accordingly, in the present embodiment, the pigment is in a state of dispersion containing a carboxylate from the viewpoint of enhancing the reactivity with the reaction liquid.

If the pigment and the polymer emulsion contain plural types of anionic groups, EmpKa and PigpKa can be determined by the anionic group mainly involved in the dispersion. For example, if a polymer emulsion dispersed with a mixture of a sulfonate and a carboxylate does not flocculate when mixed with an organic acid having a pKa of about 4.0, it can be determined that the sulfonate is mainly involved in the dispersion.

2. Compositions of Inks

The compositions of the inks will be described in detail below. The pigment inks (C, M, Y, and K), the reaction liquid (RCT), and the clear emulsion ink (Em) each contain a water-soluble organic solvent. The water-soluble organic solvent may have a boiling point in the range of 150° C. to 300° C. in view of how much the face of the printing head 9 can be wetted and kept wet. Also, in view of the function of helping polymer fine particles to form a coating film and of the swelling and dissolution of the printing medium coated with the polymer coating film, the water-soluble organic solvent may be selected from among ketones, such as acetone and cyclohexanone; pyrene glycol derivatives, such as tetraethylene glycol dimethyl ether; and heterocyclic compounds having a lactam structure, such as N-methyl-pyrrolidone and 2-pyrrolidone. The content of the water-soluble organic solvent may be in the range of 3% by mass to 30% by mass from the view of easy ejection. Examples of the water-soluble organic solvent include alkyl alcohols having a carbon number of 1 to 4, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or hydroxy ketones, such as acetone and diacetone alcohol; ethers, such as tetrahydrofuran and dioxane; polyalkylene glycols, such as polyethylene glycol and polypropylene glycol; ethylene glycol or alkylene glycols whose alkylene group has a carbon number of 2 to 6, such as propylene glycol, butylene glycol, triethylene glycol, 1,2,6-hexanetriol, thiodiglycol, hexylene glycol, and diethylene glycol; lower alkyl ether acetates, such as polyethylene glycol monomethyl acetate; glycerin; lower alkyl ethers, such as ethylene glycol monomethyl (or monoethyl) ether, diethylene glycol methyl (or ethyl) ether, and triethylene glycol monomethyl (or monoethyl) ether; polyhydric alcohols, such as trimethylolpropane and trimethylolethane; and N-methyl-2-pyrrolidone, 2-pyrrolidone, and 1,3-dimethyl-2-imidazolidinone. One of these water-soluble organic solvents may be used singly, or a mixture of two or more of these organic solvents may be used. Water may be deionized water. The water-soluble organic solvent content in the reaction liquid (RCT) is not particularly limited. The pigment inks (C, M, Y, and K) and the clear emulsion ink (Em) may optionally contain a surfactant, an antifoaming agent, a preservative, a fungicide, and the like in addition to necessary components to impart a desired physical property.

Each of the pigment inks (C, M, Y, and K), the reaction liquid (RCT), and the clear emulsion ink (Em) contains a surfactant. The surfactant is intended to act as a penetration agent to help the ink penetrate the ink jet printing medium. As the surfactant content is increased, the surface tension of the ink decreases, and, accordingly, the ink can more easily wet and penetrate the printing medium. In the present embodiment, a small amount of acetylene glycol EO adduct or the like is added as the surfactant to each ink to adjust the surface tension of the ink so that the surface tension of each ink becomes 30 dyn/cm or less with a difference of 2 dyn/cm or less from the surface tension of the other inks. More specifically, the surface tension of each ink is adjusted to about 28 dyn/cm to about 30 dyn/cm. For measuring surface tension, an automatic surface tensiometer CBVP-Z (manufactured by Kyowa Interface Science) may be used. Any other instrument may be used as long as it can measure the surface tension of the inks.

Each of the inks of the present embodiment is stably alkaline and has a pH of 8.5 to 9.5. From the viewpoint of preventing the components or members of the printing apparatus and head that will come in contact with the inks from dissolving or being damaged, and preventing decrease in solubility of the resin involved in dispersion in the ink, pH of each ink may be in the range of 7.0 to 10.0. The pH may be measured with a pH meter model F-52 manufactured by Horiba. Any other instrument may be used as long as it can measure the pH of the inks.

2-1. Pigment Inks

For simplicity in description, only the cyan (C) and magenta (M) inks of the pigment inks (black (K), cyan (C), magenta (M), and yellow (Y)) used in the present embodiment will be described.

2-1-1. Magenta Ink

Preparation of Dispersion Liquid

First, an AB block copolymer having an acid value of 300 and a number average molecular weight of 2500 is produced from benzyl acrylate and methacrylic acid in a conventional process. Then, the reaction system is neutralized with an aqueous solution of potassium hydroxide and diluted with ion exchanged water to yield a 50% by mass homogeneous aqueous solution of the polymer.

Then, 100 g of the polymer solution is mixed with 100 g of C.I. Pigment Red 122 and 300 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes) to remove undispersed components including course particles, thus yielding a magenta dispersion liquid. The magenta dispersion liquid contains 10% by mass of pigment and 5% by mass of dispersant.
Preparation of Ink For preparing a magenta ink, the magenta dispersion liquid is mixed with the following ingredients to a desired concentration. After sufficiently mixing the ingredients with stirring, the mixture is subjected to pressure filtration through a microfilter of 2.5 μm in pore size (produced by Fujifilm Corporation) to yield a pigment ink containing 4% by mass of the pigment and 2% by mass of the dispersant.
Magenta dispersion liquid: 40 parts
2-Pyrrolidone: 5 parts
2-Methyl-1,3-propanediol: 15 parts
Acetylene glycol EO adduct (produced by Kawaken Fine Chemicals): 0.5 part
Ion-exchanged water: balance
2-1-2. Cyan Ink
Preparation of Dispersion Liquid First, an AB block copolymer having an acid value of 250 and a number average molecular weight of 3000 is produced from benzyl acrylate and methacrylic acid in a conventional process. Then, the reaction system is neutralized with an aqueous solution of potassium hydroxide and diluted with ion exchanged water to yield a 50% by mass homogeneous aqueous solution of the polymer.

Then, 180 g of the polymer solution is mixed with 100 g of C.I. Pigment Blue 15:3 and 220 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes) to remove undispersed components including course particles, thus yielding a cyan dispersion liquid. The cyan dispersion liquid contains 10% by mass of pigment and 10% by mass of dispersant.
Preparation of Ink For preparing a cyan ink, the cyan dispersion liquid is mixed with the following ingredients to a desired concentration. After sufficiently mixing the ingredients with stirring, the mixture is subjected to pressure filtration through a microfilter of 2.5 μm pore size (produced by Fujifilm Corporation) to yield a pigment ink containing 2% by mass of the pigment and 2% by mass of the dispersant.
Cyan dispersion liquid: 20 parts
2-Pyrrolidone: 5 parts
2-Methyl-1,3-propanediol: 15 parts
Acetylene glycol EO adduct (produced by Kawaken Fine Chemicals): 0.5 part
Ion-exchanged water: balance
2-2. Reaction Liquid The reaction liquid used in the present embodiment contains a reactive component that can react with the pigment in each ink to flocculate the particles of the pigment or gels the pigment. More specifically, when the reaction liquid is mixed with an ink containing a pigment stably dispersed or dissolved in a water-soluble medium by the function of an ionic group, the reactive component destroys the stable dispersion of the pigment. In the present embodiment, glutaric acid is used as the reactive component, as described above.

However, the reactive component is not necessarily glutaric acid, and, in another embodiment, any other water-soluble organic acid may be used. Examples of such an organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, oxysuccinic acid, and dioxysuccinic acid. The organic acid content may be in the range of 3.0% by mass to 90.0% by mass, beneficially in the range of 5.0% by mass to 70.0% by mass, relative to the total mass of the reaction liquid.
Preparation of Ink (Reaction Liquid)

In the present embodiment, glutaric acid (produced by Wako Pure Chemical Industries) is used as the organic acid, or reactive component, and mixed with the following ingredients to yield reaction liquid 1:
Glutaric acid: 3 parts
2-Pyrrolidne: 5 parts
2-Methyl-1,3-propanediol: 15 parts
Acetylene glycol EO adduct (produced by Kawaken Fine Chemicals): 0.5 part
Ion-exchanged water: balance
2-3. Clear Emulsion Ink The clear emulsion ink used in the present embodiment contains a polymer emulsion, but does not contain any coloring material.

The term "polymer emulsion" mentioned herein refers to polymer fine particles dispersed in water. Examples of such polymer fine particles include acrylic resin fine particles synthesized by emulsion polymerization of a monomer such as alkyl (meth)acrylate ester or (meth)acrylic acid alkylamide, styrene-acrylic resin fine particles synthesized by emulsion polymerization of an alkyl (meth)acrylate ester or a (meth)acrylic acid alkylamide with a styrene monomer, polyethylene resin fine particles, polypropylene resin fine particles, polyurethane resin fine particles, and styrene-butadiene resin fine particles. Other types of polymer fine particles may also be used such as core-shell polymer fine particles each including a core and a shell that are made of polymers having different compositions, or polymer fine particles produced by emulsion polymerization using acrylic resin fine particles synthesized in advance as seeds for controlling the particle size. Also, hybrid polymer fine particles may be used which are produced by chemically combining different types of resin fine particles, for example, combining acrylic resin fine particles and urethane resin fine particles.

The "polymer fine particles dispersed in water", or polymer emulsion, may be in a state of fine particles produced by polymerization or copolymerization of one or more monomers having a dissociable group, that is, in a state of dispersion of self-dispersible polymer fine particles. The dissociable group in this instance may be a sulfo group, as described above. Other monomers having a dissociable group include acrylic acid and methacrylic acid. The "polymer fine particles dispersed in water" may be what is called an emulsifier-dispersed polymer fine particle dispersion prepared by dispersing polymer fine particles with an emulsifier. The emulsifier may be a substance having an anionic charge, irrespective of whether it has a low molecular weight or a high molecular weight.

The dissociable group is not necessarily the sulfo group as long as AcpKa>EmpKa holds true. For example, the dissociable group may be the phosphate group.

Any polymer containing a sulfo group, including generally used natural or synthetic polymers and a novel polymer developed for the clear emulsion ink, may be used as the polymer component of the polymer fine particles without particular limitation. From the viewpoint of general use and easy design of the function of the polymer fine particles, a homopolymer or a copolymer of one or more monomers having a radically polymerizable unsaturated bond, similar to acrylic resin or styrene-acrylic resin may be used.

The monomer having a radically polymerizable unsaturated bond may be a hydrophilic radically polymerizable unsaturated monomer containing sulfo group, and examples thereof include styrenesulfonic acid, sulfonic acid-2-propylacrylamide, acrylic acid-2-ethyl sulfonate, methacrylic acid-2-ethyl sulfonate, butylacrylamide sulfonic acid, and salts thereof.

The hydrophilic radically polymerizable unsaturated monomer may be used in combination with any other monomer not containing a sulfo group, and examples of such a monomer include monomers having a carboxy group, such as acrylic acid, methacrylic acid, crotonic acid, ethacrylic acid, propylacrylic acid, isopropylacrylic acid, itaconic acid, and fumaric acid, and salts thereof; and monomers having a phosphonate group, such as methacrylic acid 2-ehyl phosphonate and acrylic acid 2-ethyl phosphonate.

Hydrophobic monomers may be used, and examples thereof include (meth)acrylic acid esters, such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, and benzyl methacrylate; styrene-based monomers, such as styrene, α-methylstyrene, o-methylstyrene, m-methylstyrene, p-methylstyrene, and p-tert-butylstyrene; itaconic acid esters, such as benzyl itaconate; maleic acid esters, such as dimethyl maleate; fumaric acid esters, such as dimethyl fumarate; and acrylonitrile and vinyl acetate. Known or novel oligomers or macromonomers may be used without particular limitation.

Since the radically polymerizable monomer used in the present embodiment will be subjected to aqueous precipitation polymerization to form polymer fine particles having a sulfo group, the radically polymerizable monomer may be selected according to the desired properties of the polymer fine particles. Hence, it may be a known radically polymerizable monomer or a novel monomer developed for the clear emulsion ink of the present disclosure.

In the present embodiment, the polymer of the polymer fine particles having a sulfo group may be a copolymer of monomers including at least one of the above-cited hydrophilic monomers having a sulfo group and at least one of the above-cited hydrophobic monomers. This is beneficial in providing an ink in a good dispersion state and an ink set that can produce high-quality printed articles. For producing the polymer fine particles, desired properties of the polymer fine particles can be controlled by appropriately selecting some factors, such as the polymerization initiator to be used and the content thereof and the monomers forming the copolymer and the proportions thereof.

Although the radial polymerization is performed under conditions appropriately selected depending on the polymerization initiator, dispersant, and the properties of the monomers, the reaction temperature may be 100° C. or less, such as in the range of 40° C. to 80° C. The reaction time may be 1 hour or more, such as in the range of 6 hours to 30 hours. The stirring speed during the reaction may be in the range of 50 rpm to 500 rpm, such as 150 rpm to 400 rpm.

When at least one hydrophobic monomer and at least one hydrophilic monomer having a sulfo group are polymerized to form polymer fine particles having a sulfo group, the monomers may be dropped in an aqueous dispersion containing an aqueous radical polymerization initiator. It is beneficial to keep the proportions of the monomers constant from the viewpoint of uniformly producing desired polymer fine particles having a sulfo group from monomers having different natures such as the combination of the hydrophobic monomer and the hydrophilic monomer. If a mixture of the monomers is added to a polymerization system in a much higher amount than the amount of monomers that will be consumed in a certain time for the polymerization, the polymerization tends to proceed in such a manner that only a specific monomer is precedently polymerized and consumed, followed by polymerization of the rest of the monomers. In this instance, the resulting sulfo group-containing polymer fine particles have nonuniform properties.

In the case of a polymer component containing a hydrophilic monomer component with a high content, the polymer may not be able to precipitate due to the high hydrophilicity thereof, thus remaining as a water-soluble component in the reaction system without forming sulfo group-containing polymer fine particles. The polymer fine particles may be synthesized by a known method.

In the present embodiment, the aqueous dispersion is prepared by dispersing insoluble polymer fine particles in water with a water-soluble resin acting as a dispersant. The resulting polymer fine particles, which have a sulfo group, can be stably dispersed. The preparation of the clear emulsion ink will now be described in detail.

Preparation of Ink

The dispersion of the polymer fine particles is prepared as below.

First, 28.5 parts of hydrophobic monomer methyl methacrylate and a mixture of 4.3 parts of hydrophilic monomer sodium p-styrenesulfonate and 30 parts of water are gradually dropped into a mixture of 0.05 parts of polymerization initiator potassium persulfate and 30 parts of water, and a polymerization is performed for 5 hours with stirring with a motor at 70° C. in a nitrogen atmosphere.

The resulting polymer fine particles are mixed with the following ingredients so as to have a content of 10% in the resulting ink, and the mixture is subjected to pressure filtration through a microfilter of 2.5 μm in pore size (produced by Fujifilm Corporation) to yield a clear emulsion ink.

2-Pyrrolidone: 5 parts
2-Methyl-1,3-propanediol: 15 parts
Acetylene glycol EO adduct (produced by Kawaken Fine Chemicals): 0.5 part
Ion-exchanged water: balance 3. Preparation of Comparative Reaction Liquids Two reaction liquids 2 and 3 are prepared. While reaction liquid 1 contains glutaric acid as the organic acid as describe above, reaction liquid 2 contains a multivalent metal salt calcium methanesulfonate instead of the organic acid. Reaction liquid 2 is prepared by mixing the following ingredients:
Calcium methanesulfonate: 5 parts
2-Pyrrolidone: 5 parts
2-Methyl 1,3-propanediol: 15 parts
Acetylene glycol EO adduct (produced by Kawaken Fine Chemicals): 0.5 part
Ion-exchanged water: balance For reaction liquid 3, a cationic polymer, polyallylamine hydrochloride, is substituted for glutaric acid used in reaction liquid 1. Reaction liquid 3 is prepared by mixing the following ingredients:
Polyallylamine hydrochloride: 1.5 parts
2-Pyrrolidone: 5 parts
2-Methyl-1,3-propanediol: 15 parts
Acetylene glycol EO adduct (produced by Kawaken Fine Chemicals): 0.5 part
Ion-exchanged water: balance 4. Reactivity of Inks As described above, when the inks of the present embodiment are used, the pigment reacts with the reactive component in the reaction liquid, and the polymer emulsion does not react with the reactive component.

The inks were subjected to an examination for evaluation of reactivities among the inks.

Reaction liquids 1, 2, and 3 were each diluted to 100 times with pure water, and 5 g of the diluted liquids were each placed in a 10 mm vessel. Into this vessel was dropped 0.25 g of 3% aqueous solution of any one of the pigments and the polymer emulsion. After standing for 60 minutes, the ratio of the height of the precipitate from the bottom of the vessel to the height of the liquid from the bottom to the surface of the liquid was calculated. A higher calculated value suggests that the pigment or polymer emulsion is more reactive with the reactive component in the reaction liquid. This calculated value is herein referred to the precipitation value of the pigment or polymer fine particles in the reaction liquid (simply referred to as "the precipitation value of the pigment" or "the precipitation value of the polymer emulsion" in some cases). When the precipitation value was lower than 0.1, it seemed that the pigment or polymer fine particles did not react with the reaction liquid. Accordingly, when the precipitation value was lower than 0.1, the sample was determined to be unreactive; and when the precipitation value was higher than 0.1, the sample was determined to be reactive.

Table 1 shows the results of whether or not each of the pigments and the polymer emulsion is reactive, determined based on the precipitation value. In Table 1, ○ represents reactive sample; and × represents unreactive sample.

TABLE 1

|  | Reaction liquid 1 | Reaction liquid 2 | Reaction liquid 3 |
| --- | --- | --- | --- |
| Magenta pigment 3% solution | ○ | ○ | ○ |
| Cyan pigment 3% solution | ○ | ○ | ○ |
| Polymer emulsion 3% solution | × | ○ | ○ |

Table 1 shows that the comparative reaction liquids 2 and 3 are reactive with both the pigments and the polymer emulsion. On the other hand, reaction liquid 1 is reactive with the pigments, but not reactive with the polymer emulsion.

The glossiness and bleeding of printed articles prepared with the ink set according to the present embodiment were examined.

Table 2 shows the results when printing was performed on a glossy vinyl chloride non-absorbent printing medium. (KSM-VS2 gloss, 170 μm, manufactured by Kimoto) with ink sets including the magenta ink, any one of reaction liquids 1 to 3, and the clear emulsion ink. In this examination, printed articles were prepared by ejecting the pigment ink, the reaction liquid, and the clear emulsion ink respectively at duties of 100%, 20%, and 50% and were visually observed for examining bleeding and glossiness. The duty of 100% is defined as the case where all the pixels in an area receive ejected ink once.

Glossiness may be evaluated based on the gloss measured in accordance with the method specified in JIS K 5600-4-7. For simplicity, glossiness was evaluated by visual observation. When the glossiness of the printed surface was almost the same as that of the printing medium, the glossiness was determined to be high; and when the glossiness of the printed surface was lower than that of the printing medium, the glossiness was determined to be low.

For evaluating bleeding, two aqueous color inks containing different pigments were ejected onto the printing medium, and the degree of bleeding at the boundary of adjacent images was measured. More specifically, the degree of bleeding between the two different color pigment inks was visually observed with a distance of 30 cm from the printed surface. When bleeding was recognized, the evaluation in bleeding was determined to be low; and when bleeding was not recognized, it was determined to be high. For quantitative measurement, the degree of bleeding may be represented by numeral values by using a personal image quality evaluation system Personal IAS (ISO 13660 compliant, manufactured by Quality Engineering Associate).

TABLE 2

|  | Reaction liquid 1 | Reaction liquid 2 | Reaction liquid 3 |
| --- | --- | --- | --- |
| Bleeding Evaluation | High | High | High |
| Glossiness | High | Low | Low |

As shown in Table 2, glossiness was reduced when reaction liquid 2 or 3 was used. This is probably because the polymer emulsion is flocculable in combined use with the reactive component, accordingly reacting to flocculate, and consequently does not form a film coating the surface of the printed image.

On the other hand, in the case of using reaction liquid 1, where the above-described relationship: PigpKa>AcpKa>EmpKa holds true, the pigment is likely to precipitate, while the polymer emulsion is unlikely to precipitate. Consequently, bleeding is reduced, and decrease in glossiness is suppressed.

Second Embodiment

In the first embodiment, the inks K, C, K, Y, Em, and RCT are applied in random order with the same mask patterns.

In a second embodiment, the pigment inks, the reaction liquid, and the clear emulsion ink are applied with respective mask patterns so that the inks are applied to a unit area in a specific order.

In the following description, the same description as in the first embodiment will be omitted.

In the present embodiment, each unit area is printed by 16 times of scanning.

FIGS. 7A to 7D are illustrative representations of mask patterns used in the present embodiment. FIGS. 7A, 7B, 7C, and 7D depict mask patterns corresponding to the line 22C of ejection openings for the cyan ink, the line 22M of ejection openings for the magenta ink, the line 22RCT of ejection openings for the reaction liquid, and the line 22Em of ejection openings for the clear emulsion ink, respectively.

Figure 7A:
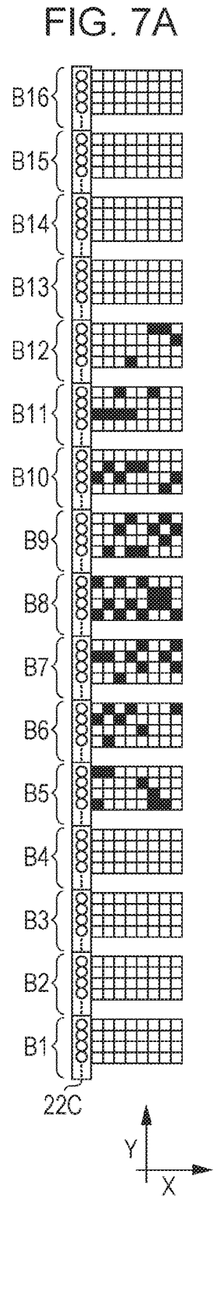
FIGS. 7A to 7D are each an illustrative representation of mask patterns used in an embodiment of the present disclosure.

As shown in FIG. 7A, among the mask patterns for the ejection opening groups B1 to B16 of cyan ink ejection opening line 22C corresponding to the first to the 16th scanning, the mask patterns for the intermediate ejection opening groups B5 to B12 corresponding to the 5th to the 12th scanning have printable pixels. The ejection opening groups B1 to B4 for the first to the fourth scanning and the ejection opening groups B13 to B16 for the 13th to the 16th scanning do not have any printable pixel. Thus, the cyan ink is ejected in the 5th to the 12th of the 16 times of scanning.

Figure 7B:
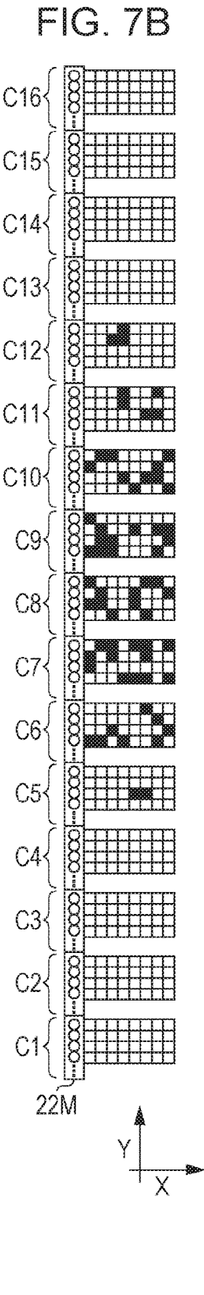

Similarly, among the mask patterns for the ejection opening groups C1 to C16 of the magenta ink ejection opening line 22M corresponding to the first to the 16th scanning, the mask patterns for the ejection opening groups C5 to C12 corresponding to the 5th to the 12th scanning have printable pixels, as shown in FIG. 7B. Thus, the magenta ink is also ejected in the 5th to the 12th of the 16 times of scanning.

Figure 7C:
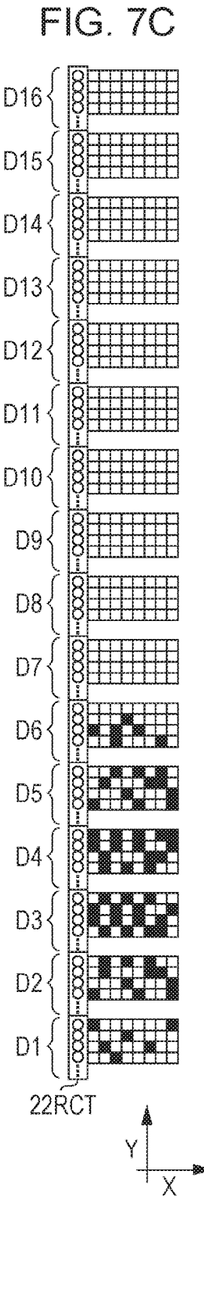

For the ejection opening line 22RCT for the reaction liquid, among the mask patterns for the ejection opening groups D1 to D16 corresponding to the first to the 16th scanning, the mask patterns for ejection opening groups D1 to D6 corresponding to the first to the 6th scanning have printable pixels. The mask patterns for other ejection opening groups D7 to D16 corresponding to the 7th to the 16th scanning do not have any printable pixel. Thus, the reaction liquid is ejected in the first to the 6th of the 16 times of scanning.

Figure 7D:
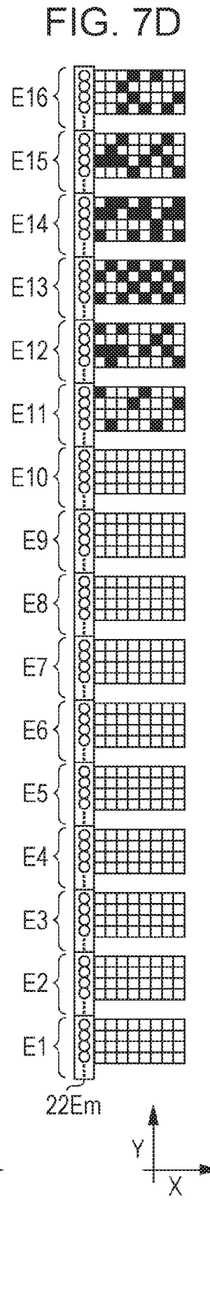

For the ejection opening line 22Em for the clear emulsion ink, among the mask patterns for the ejection opening groups E1 to E16 corresponding to the first to the 16th scanning, the mask patterns for ejection opening groups E11 to E16 corresponding to the 11th to the 16th scanning have printable pixels. The mask patterns for other ejection opening groups E1 to E10 corresponding to the first to the 10th scanning do not have any printable pixel. Thus, the clear emulsion ink is ejected in the 11th to 16th of the 16 times of scanning.

As just described, in the present embodiment, the reaction liquid is ejected in the first several times of scanning; then, the pigment inks (cyan ink and magenta ink) are ejected in the next several times of scanning; and the clear emulsion ink is ejected in the last several times of scanning.

More specifically, only the reaction liquid is ejected in the first to the 4th scanning. Then, in the 5th and the 6th scanning, the pigment inks and the reaction liquid are ejected. In the 7th to the 10th scanning, only the pigment inks are ejected. In the 11th and the 12th scanning, the pigment inks and the clear emulsion ink are ejected. Finally, in the 13th to the 16th scanning, only the clear emulsion ink is ejected.

In the present embodiment, after the reaction ink is applied onto the printing medium to some extent, the pigment inks are applied. Therefore, on landing on the printing medium, the pigment inks come into contact with the reaction liquid, immediately starting to flocculate. Thus, bleeding of the pigment inks is reduced.

The clear emulsion ink is applied onto the printing medium after a time (for the 7th to the 10th scanning) has elapsed since the reaction liquid has been applied. Thus, when the clear emulsion ink is ejected, the reaction liquid has lost reactivity. Therefore, the clear emulsion ink does not flocculate.

Also, the clear emulsion ink is applied onto the printing medium after the pigment inks have been applied. Thus, even if the image has a large surface roughness after the pigment inks have been applied, the rough surface is overcoated with the polymer emulsion by finally applying the clear emulsion ink, and, thus, the glossiness of the image is improved.

From the above, by applying the same inks as in the first embodiment in such an order that the reaction liquid is ejected in the first several times of scanning, the pigment inks are subsequently ejected in the next several times of scanning, and the clear emulsion ink is ejected in the last several times of scanning, the resulting image has reduced bleeding and improved glossiness compared to those in the first embodiment.

Although in the present embodiment, the reaction liquid and the pigment inks are ejected in the 5th and the 6th scanning, and the pigment inks and the clear emulsion ink are ejected in the 11th and the 12th scanning, other embodiments may be applied.

Figure 8A:
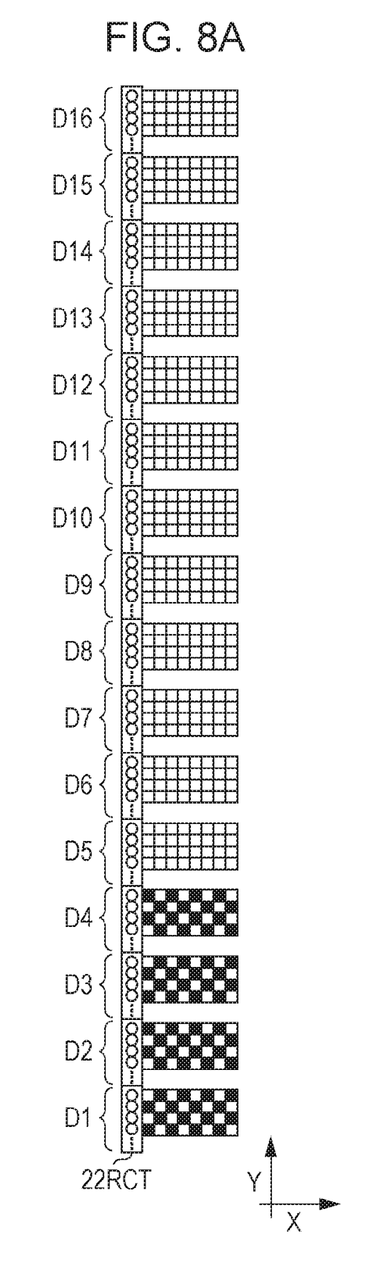
FIGS. 8A and 8B are each an illustrative representation of mask patterns used in an embodiment of the present disclosure.
Figure 8B:
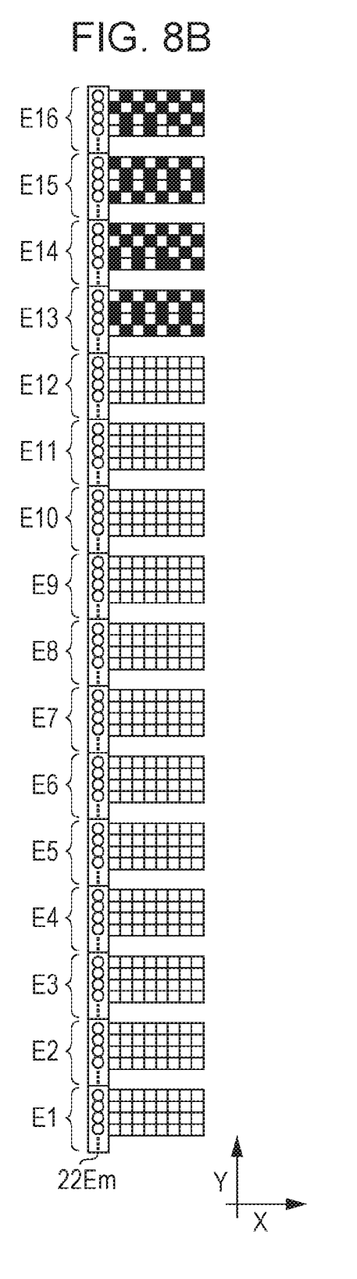

FIG. 8A depicts mask patterns for a reaction liquid election opening line 22RCT, and FIG. 8B depicts mask patterns for a clear emulsion ink ejection opening line 22Em. For the pigment inks, the same mask patterns as shown in FIGS. 7A and 7B are used.

In this instance, when the mask patterns shown in FIGS. 7A, 7B, 8A, and 8B are used, only the reaction liquid is ejected in the first to the 4th scanning, only the pigment inks are then ejected in the 5th to the 12th scanning, and only the clear emulsion ink is ejected in the 13th to the 16th scanning. This embodiment can also reduce bleeding and improve glossiness.

Other Embodiments

In general, the larger the difference in pKa, the higher the reaction speed. Since the pigment needs to react with the reactive component, it is beneficial that the difference in pKa between the anionic group of the water-soluble resin in the pigment ink and the reactive component is large. More specifically, the difference in pKa between the anionic group in the pigment ink and the reactive component may be 0.5 or more.

Although in the above embodiments, the reaction liquid and the clear emulsion ink do not contain a coloring material, these inks may contain a small amount of coloring material to the extent printed images are not affected in some embodiments. In the description disclosed herein, the expression "containing substantially no coloring material" and similar expression imply that a small amount of coloring material may be contained to the extent the printed images are not affected.

Although in the disclosed embodiments, the idea disclosed herein is implemented in a printing apparatus and a printing method using the printing apparatus, the idea may be implemented in an image processing apparatus or method adapted to generate data used for the disclosed printing method. In an embodiment, a software program used for the printing method disclosed herein may be provided separately for the printing apparatus.

Also, the idea disclosed herein may be implemented effectively in many types of ink jet printing apparatus including thermal jet type and piezoelectric ink jet type.

The printing medium used herein is not limited to a paper medium used in ordinary printing apparatuses, and may be cloth, a plastic film, a metal plate, or a medium of any other material that can receive ink, such as glass, ceramic, wood, or leather.

The ink set disclosed herein enables glossy printed articles with reduced bleeding to be produced by printing using a polymer emulsion-containing ink.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035389 filed Feb. 27, 2017, which is hereby incorporated by reference herein in its entirety.

What is claimed is:

1. An ink set comprising different inks having different functions, the inks including:
   a first ink containing a pigment as a coloring material, and a water-soluble resin having an anionic group;
   a second ink containing substantially no coloring material and a reactive component reactive with the first ink; and
   a third ink containing substantially no coloring material, a polymer emulsion, and a water-soluble resin having an anionic group,
   wherein the pKa of the reactive component in the second ink is lower than the pKa of the anionic group of the water-soluble resin in the first ink and higher than the pKa of the anionic group of the water-soluble resin in the third ink so that the pigment in the first ink in combined use with the second ink is more flocculable than the polymer emulsion in the third ink in combined use with the second ink.

2. The ink set according to claim 1, wherein the reactive component in the second ink is an organic acid.

3. The ink set according to claim 2, wherein the reactive component in the second ink is glutaric acid.

4. The ink set according to claim 1, wherein the water-soluble resin in the third ink has a sulfo group or a phosphate group.

5. The ink set according to claim 1, wherein the water-soluble resin in the first ink has a carboxy group.

6. The ink set according to claim 1, wherein the polymer emulsion in the third ink forms a coating film when being heated.

7. The ink set according to claim 1, wherein the pigment in the first ink in combined use with the second ink is more flocculable than the polymer emulsion in the third ink in combined use with the second ink.

8. The ink set according to claim 1, wherein the precipitation value of the pigment in the first ink in combined use with the second ink is higher than 0.1, and the precipitation value of the polymer emulsion in the third ink in combined use with the second ink is less than 0.1.

9. The ink set according to claim 1, wherein the difference in pKa between the anionic group of the water-soluble resin in the first ink and the reactive component in the second ink is 0.5 or more.

10. A printing apparatus, comprising:
    a printing head configured to eject different inks having different functions, the inks including a first ink containing a pigment as a coloring material and a water-soluble resin having an anionic group, a second ink containing substantially no coloring material and a reactive component reactive with the first ink, and a third ink containing substantially no coloring material, polymer emulsion, and a water-soluble resin having an anionic group, wherein the pKa of the reactive component in the second ink is lower than the pKa of the anionic group of the water-soluble resin in the first ink and higher than the pKa of the anionic group of the water-soluble resin in the third ink so that the pigment in the first ink in combined use with the second ink is more flocculable than the polymer emulsion in the third ink in combined use with the second ink; and
    a controller configured to control an ejection of the inks from the printing head onto a printing medium.

11. The printing apparatus according to claim 10, wherein the controller controls the ejection so that printing is performed while the printing head scans a unit area of the printing medium a plurality of times.

12. The printing apparatus according to claim 11, wherein the controller controls the ejection so that the second ink is ejected with a higher proportion than the first ink in an earlier time of the plurality of times of scanning.

13. The printing apparatus according to claim 12, wherein the controller controls the ejection so that the first ink is not ejected before the first scanning of the plurality of times of scanning and the second ink is not ejected after the first scanning of the plurality of times of scanning.

14. The printing apparatus according to claim 11, wherein the controller controls the ejection so that the third ink is ejected with a higher proportion than the first ink in a later time of the plurality of times of scanning.

15. The printing apparatus according to claim 14, wherein the controller controls the ejection so that the third ink is not ejected before the second scanning of the plurality of times of scanning and the first ink is not ejected after the second scanning of the plurality of times of scanning.

16. The printing apparatus according to claim 10, wherein the reactive component in the second ink is an organic acid.

17. The printing apparatus according to claim 16, wherein the reactive component in the second ink is glutaric acid.

18. The printing apparatus according to claim 10, wherein the water-soluble resin in the third ink has a sulfo group or a phosphate group.

19. The printing apparatus according to claim 10, wherein the water-soluble resin in the first ink has a carboxy group.

20. The printing apparatus according to claim 10, wherein the polymer emulsion in the third ink forms a coating film when heated.

21. The printing apparatus according to claim 10, wherein a precipitation value of the pigment in the first ink in combined use with the second ink is higher than 0.1, and a precipitation value of the polymer emulsion in the third ink in combined use with the second ink is less than 0.1.

22. The printing apparatus according to claim 10, wherein a difference in pKa between the anionic group of the water-soluble resin in the first ink and the reactive component in the second ink is 0.5 or more.

23. The printing apparatus according to claim 10, further comprising ink tanks storing the respective different inks fed to the printing head.

24. An ink set comprising different inks having different functions, the inks including:
    a first ink containing a pigment as a coloring material, and a water-soluble resin having an anionic group;
    a second ink containing substantially no coloring material and a reactive component reactive with the first ink; and a third ink containing substantially no coloring material, a polymer emulsion, and a water-soluble resin having an anionic group, wherein the reactivity between the reactive component in the second ink and the anionic group of the water-soluble resin in the first ink is higher than the reactivity between the reactive component in the second ink and the anionic group of the water-soluble resin in the third ink.

* * * * *